R. W. SCOTT.

WELTED GARMENT AND METHOD OF MAKING THE SAME.

APPLICATION FILED MAY 7, 1914.

Reissued June 16, 1914.

13,751.

2 SHEETS—SHEET 1.

Witnesses

M. G. Crozier

Mary F. Griffin

Inventor

Robert W. Scott, by Robert C. Cheek his attorney

R. W. SCOTT.

WELTED GARMENT AND METHOD OF MAKING THE SAME.

APPLICATION FILED MAY 7, 1914.

Reissued June 16, 1914. 13,751.

2 SHEETS—SHEET 2.

Witnesses

M. S. Crozier

Mary F. Griffin

Inventor

Robert W. Scott, by Robert C. Creed his attorney

UNITED STATES PATENT OFFICE.

ROBERT W. SCOTT, OF BOSTON, MASSACHUSETTS, ASSIGNOR TO SCOTT & WILLIAMS, INCORPORATED, OF CAMDEN, NEW JERSEY, A CORPORATION OF NEW JERSEY.

WELTED GARMENT AND METHOD OF MAKING THE SAME.

13,751. Specification of Reissued Letters Patent. Reissued June 16, 1914.

Original No. 1,079,268, dated November 18, 1913, Serial No. 748,309. Application for reissue filed May 7, 1914. Serial No. 837,061.

*To all whom it may concern:*

Be it known that I, ROBERT W. SCOTT, a citizen of the United States, and resident of Boston, in the county of Suffolk and State of Massachusetts, have invented a certain new and useful Improvement in Welted Garment and Method of Making the Same, of which the following is a specification.

The object of my invention is to provide a stocking or other garment having an improved hem or welt at the top thereof, which hem or welt shall be elastic, of firm close-textured fabric, and integrally attached to the leg or body portion of the garment.

A further object is to produce such a structure by a continuous operation upon a circular or other knitting machine, having knitting instruments capable of knitting a tubular fabric, or a section of fabric which may subsequently be formed into a tube.

Figure 2:
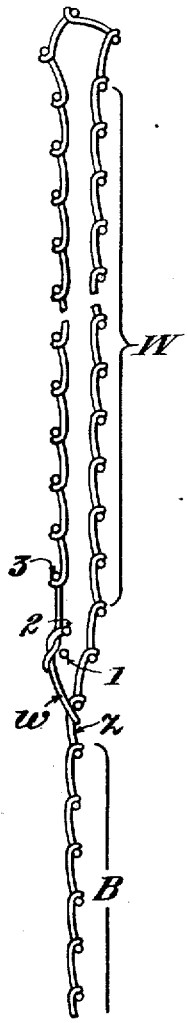
Figure 1:
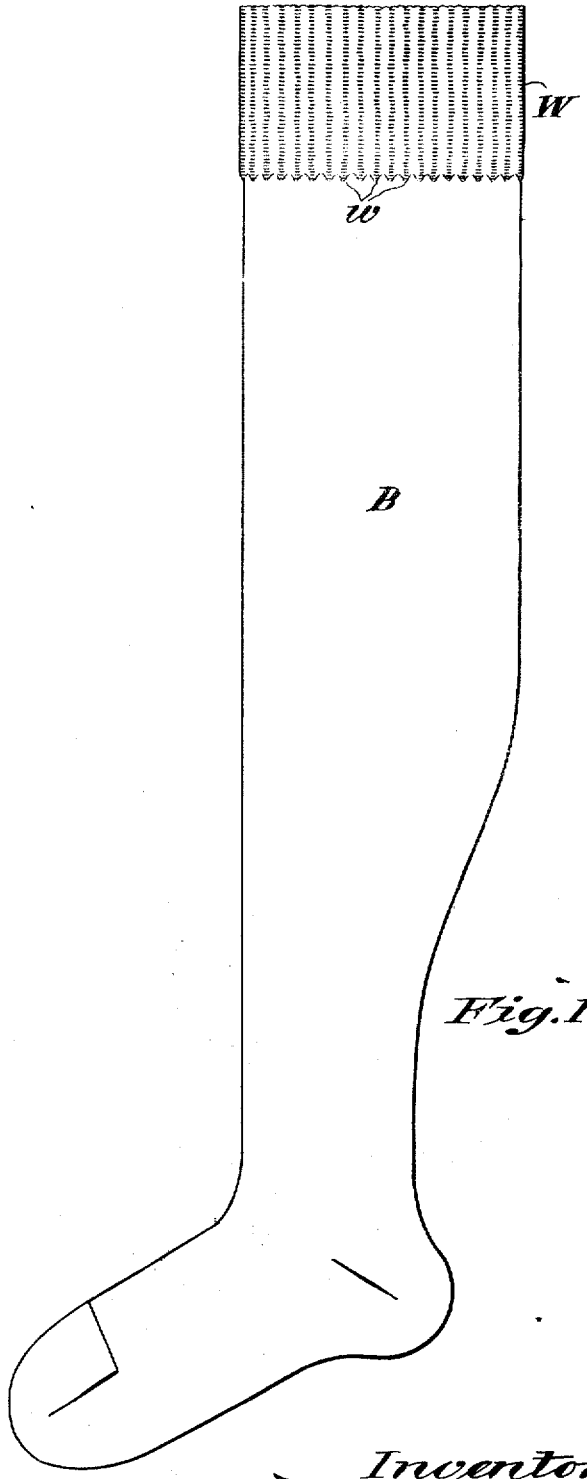
Figure 3:
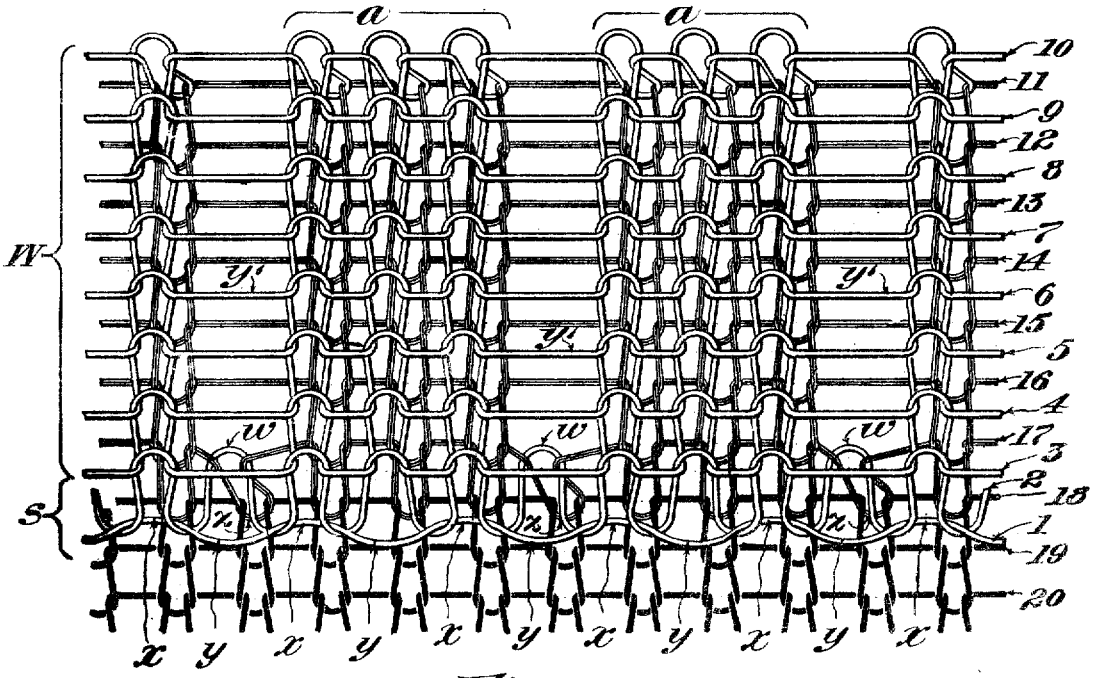
Figure 4:
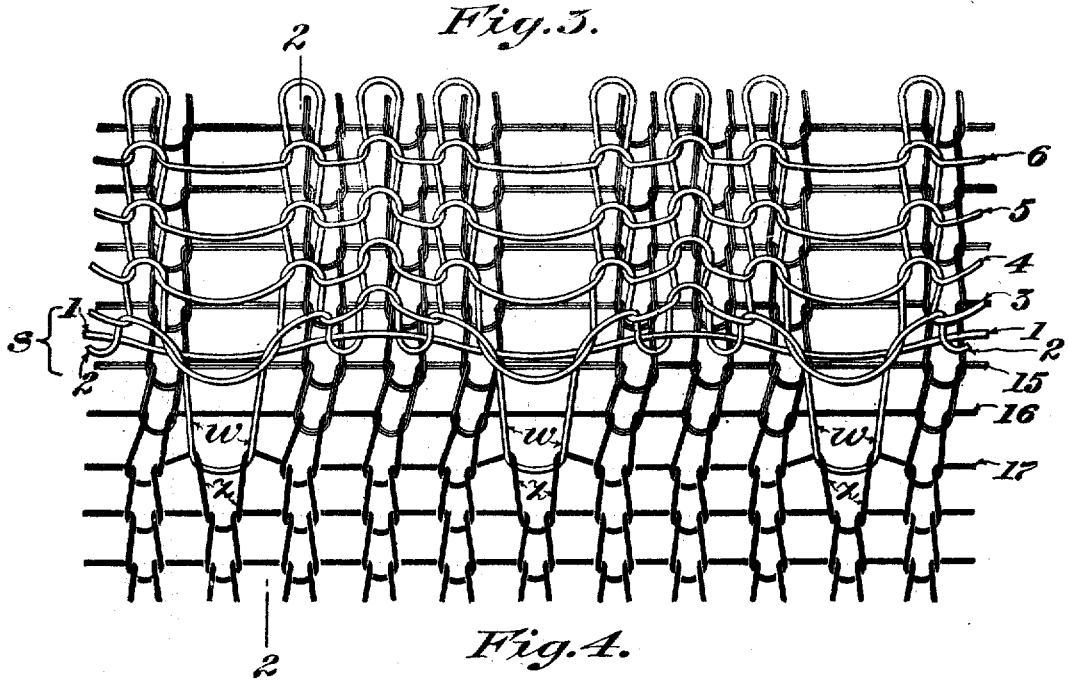

In the accompanying drawings, Figure 1 is an elevation showing a woman's stocking made according to my invention; Fig. 2 is a section through the integral welt at the top of said stocking; Fig. 3 is a face view on an enlarged scale of a portion of the welt or hem and the adjacent body portion, in the nature of a diagram explanatory of the order of the operations; Fig. 4 shows the position of the parts of the fabric shown in Fig. 3 in the completed article.

In the production of seamless hosiery or garment sections by methods at present known in the art, the making of the leg tube, the foot, heel and toe parts have occasioned little difficulty and expense, but the stockings so far as completed by the machines employed to knit them, were either incomplete with respect to the welt or hem at the upper end, or of such a structure as to necessitate expensive separate operations, such, for instance, as the provision of a previously knit rib top, or of a plain fabric folded and transferred section, or the making of a turned-over and sewed hem. The last named structures, when provided, remained unsatisfactory, the line of union at the juncture of the welt with the body often being insufficiently elastic, or not of a good appearance.

In Letters Patent No. 864,433, dated August 27, 1907, I described a method whereby a turned welt or hem could be formed by the operation of the machine upon which the fabric was knitted, this operation being performed without the necessity of transferring stitches by hand, and consisting in first forming a setting-up course on two sets of needles, then knitting a length of web for the hem or welt upon one set of needles and permitting it to hang down from the other or inoperative set of needles, which retained the setting-up loops originally formed upon them, and then, by a certain operation of the two sets of needles transferring stitches of this web to the operative set of needles and freeing the web from the other set of needles and then proceeding with the knitting of the leg tube on the operative set of needles. Subsequently in my Patent No. 1,045,620, dated November 26, 1912, I described a method and the resulting article, whereby the welt or hem might be knit upon a single set of needles, for instance the needles employed to knit the leg of a circular stocking. In the garment of the latter patent the wrong or back side of the fabric is outward at the welt portion. My present method and the article resulting therefrom respectively are improvements upon the method and stocking disclosed in said Patent 1,045,620. One of the primary utilities of the stocking of said patent lay in the possibility of making it by the continuous operation of a machine having a single series of needles beginning with the first course of the welt and ending at the end of the toe, the product of the machine issuing complete so far as the welt was concerned. Viewed merely as a machine operation, the processes specifically described by said patent each included feeding all of the needles at the first course, as shown in Fig. 10 of said patent. The machine for knitting the product of said patent shown in said figure also necessarily involved means to manipulate some of the loops of the first course upon the needles, by other means than movements of the needles, so as to prevent their being cast over the heads of the needles during the subsequent knitting of the entire fabric of the welt, which for a usual type of woman's stocking may extend for from sixty to several hundred courses. While these are entirely feasible operations when conducted by hand or by complicated machinery, I have so far found difficulty in providing simple machinery capable of performing the necessary functions at a commercially competitive speed and with sufficient freedom from machine difficulties. On the other hand, when, as suggested in the specification of said patent, a welt for a woman's stocking was formed upon a machine having devices for throwing out of action every other one of the needles employed to knit, after all of the needles had been fed for a first course, I have found the product not to be of value when made of certain yarns and certain gages of fabric, including those yarns and those gages of fabric which are the subject of the most desirable manufacture. This is due to the trade requirement of extreme elasticity for the welt at the top of a woman's stocking, which should stretch to an extent even wider than the tubular fabric for the calf of the leg. While a great variation of elasticity may be made by changes in the length of the loop and certain permitted changes in the quality of the yarn, it is difficult in some cases to secure a sufficient width of fabric without at the same time making it of an open and sleazy texture not desirable in the article. I have also found difficulties with the operation of machinery designed to feed yarn to all the needles at the first course, then to withhold some of the needles from knitting, and then to knit upon the remaining needles. Unless special provision is made, the certain starting of the machine when operating with hard, wiry yarns is practically impossible, and the manufacture of fabrics of this nature, as a practicable machine manufacture cannot be wholly competitive with the methods of the present art unless machines can be made to begin the operation with certainty on the first course at all of the needles. I have found in the one case the objection to the fabric as an article of manufacture and in the other case the objection to the method by which the fabric is knit as a series of steps capable of performance by an automatic knitting machine may be overcome by the changes in the method and the resulting changes in the fabric about to be described. By these changes I provide for the formation before beginning the welt of a section of fabric or arrangement of yarns serving a four-fold purpose, first, as a selvage for the fabric of the hem or welt proper, second, as an ornament and finish of the completed stocking, third, as a device to enable the knitting of an increased number of wales of solid fabric in the welt proper, and fourth, as a device for the elastic attachment of the first knit section of the welt to a subsequently knit section of the welt and the body portion of the garment.

In the drawings, Fig. 1 shows a woman's stocking having a leg or body portion B and a turned welt W, the structure of which is shown in Figs. 2, 3 and 4.

Referring to Fig. 3, in which the successive courses are successively numbered, I begin the knitting of my improved stocking by feeding the course 1 into the hooks of alternate needles only of a row or set of hooked needles; the course 2 is then supplied to all of the needles, those needles which were not supplied with course 1 being so manipulated (or the yarn being so manipulated with respect to said needles) that the second course of yarn is taken into the hooks of all of the needles. Knitting movements will now result in the formation of the structure plainly shown in Fig. 3 in which the wales $y$ are initiated by a loop of the course 2 passing around the cast off bight of the yarn 1, which was originally taken by the needles of said wales. At the intervening wales $x$ the yarn 1 not having been taken in the hooks, but lying at their backs or out of their field of action, has not been cast off by the needles of the wales $x$, and is encircled by the yarn now taken by said needles. The yarn of the course 2 thus is formed into loops extending on each side of the yarn of course 1, alternately in the wales $x$ and $y$. This structure is an effective edge or selvage to prevent raveling or tearing of knit fabric, and I have shown certain forms thereof in my Patent No. 1,045,621, November 26, 1912, the structure in Fig. 2 of said patent resembling the courses 1 and 2, of the present fabric above described. A further advantage of said structure for my present purposes lies in the interloopment given the yarn of course 1, by which it is made to occupy an extent greatly in excess of a straight line joining the wales of the fabric. The selvage formed by the yarns 1 and 2, constituting the first two courses knit, is a sufficient protection of the edge of any subsequent fabric to enable its use without any further finishing operation, except for its tendency to curl inward toward its face. Having provided in the courses 1 and 2 a selvaged section indicated upon the drawings at S, I now proceed to fasten down the initial edge of the fabric with respect to the instruments upon which it is formed by withholding every fourth loop $w$ of the course 2 from further knitting operations to constitute uniting stitches. As a machine operation I may find it convenient to retire needles upon which said loops $w$ were formed, as by withdrawing them into their carrier beneath the range of the knitting cams, so that the yarns fed to the other needles may pass over their heads. Whatever the operation, the loops $w$ are retained at the knitting instruments, so that a loop of a subsequent course may at a later time be drawn through them. Knitting now proceeds in the courses 3, 4, 5, etc., upon all of the needles of the series excepting those upon which the loop *w* was the last loop formed. It will be understood that instead of every fourth loop, the loops *w* may comprise every sixth or eighth loop. The essential characteristic of the selection of those to be withheld is that they shall be frequent enough to retain the fabric of the beginning edge of the welt or hem at the outside of the stocking, as shown in Fig. 1, against the ordinary stress of wear. It is desirable, but not essential that said loops *w* shall, as shown be withheld at that series of needles which received yarn at the first course, and therefore in one of the wales *y*.

I find that a fabric knit as shown in Fig. 3 upon repeated groups of one omitted needle and three active needles is of a close texture, the line formed by the floats or runs *y'* at every fourth needle giving it an ornamental quality very attractive in the article, while the close texture of the sections *a* of three adjacent wales of normal fabric formed between the floats or runs at the omitted needle supplies more than a sufficient elasticity in tensile strength for usual purposes. I have shown in Fig. 3 a welt only seventeen courses long, for purposes of clearness, but it will be understood that a welt may be knit in this manner of any convenient length, for instance of a sufficient number of courses to produce the proportions indicated in Fig. 1 with respect to the extent of the whole garment.

Sufficient fabric having been knit for the welt, the needle upon which the loop *w* has been standing, out of action, may be restored (or the yarn may be so manipulated with respect to a stationary series of the needles as to secure the resumption of the knitting at the wales including the loops *w*) so that the course 17, which is the initial course of the body portion, will contain no floats or runs of yarns opposite a needle withheld from action. The initial loop *z* for the body portion of the wale *y* containing the loop *w* penetrates said loop *w*, as shown in the figures. Succeeding courses of plain fabric may now be knit for the body or leg portion of the stocking. Although formed in the second course of the selvage section S, the loops *w* when the fabric is subjected to strain toward the welt end thereof will assume the shape shown in Fig. 4, rotating upon the yarn of course 1 as an axis and permitting the strain of the solid parts of the fabric knit upon the adjacent groups of needles employed to form the welt to arch the selvage upward as shown in said Fig. 4. This capacity of the fabric has the effect of releasing the initial yarn 1 except at the central wale of the three wales of solid fabric. I find that no further device is needed to secure the necessary lateral elasticity of the juncture of the welt with the body or leg portion of the garment. It will readily be understood from an inspection of Fig. 4 that the selvage structure comprising the loops *w* may be stretched to a greater extent than the plain fabric portions of the garment without rupture. The quality of the fabric further enables the employment of a change of yarn during the knitting of the welt and the knitting of longer stitches at this time. I have indicated by the use of black yarns in Figs. 3 and 4 points at which one yarn may be substituted for another. This change may or may not be accompanied by a decrease in the size of the loops for the leg or body portion of the garment. Usually the leg of the stocking will be knit with a tighter stitch than the welt which will be formed of a thicker and softer yarn than said body portion, as shown in the drawings.

Owing to the natural curl of the fabric, as I have set out in my said Patent No. 1,045,620, a stocking knit according to my process may be boarded and finished with an even flat crease at the top of the hem. The same tendency of the fabric to curl toward the face is of aid in throwing the scalloped edge formed by courses 1 and 2 inwardly toward the juncture with the body portion, contributing to the ornamental appearance of the juncture of the welt and the body parts of the fabric.

The mark made in the fabric of the welt by the floats *y'* extending between the sections of solid knit fabric, while plainly visible, is not so visible as if viewed from the face side of the fabric now turned within the welt. The elasticity of the yarn serves to bow the floats outwardly, and their effect is that of a ridge rather than a depression in the fabric.

I do not herein claim broadly knit garments having outturned integral welts united to the body, such as are disclosed and claimed in my Patent No. 1,045,620 dated November 26, 1912, nor do I herein claim the integral out-turned welt having half as many wales as the body fabric and uniting loops in alternate wales in a course subsequent to the initial course made the subject of my application Serial No. 748,308, filed Feb. 14, 1913.

What I claim is:

1: A knit garment having a body portion and an integral welt united to the body portion at recurrent wales of said body portion, said welt having a selvage structure at the initial courses of a plurality of intervening wales.

2. A knit garment provided with an integral outturned welt having uniting stitches in certain wales only of the body portion of the garment, the fabric of the welt having more wales than there are uniting stitches and fewer wales than the body portion.

3. A knit garment having a body portion and an integral welt united to the body portion at every fourth wale of said body portion, said welt having a selvage structure at the initial courses of the intervening wales.

4. A knit garment having a body portion and an integral welt comprising sections of solid fabric a plurality of wales in extent, separated by single wales of floated or free yarns, said welt having a selvage structure comprising an initial course, and a subsequent course united to the body portion of the garment in the wales occupied by the floated yarns.

5. A knit garment having an outturned welt of fabric presenting alternate sections of solid knitting in a plurality of adjacent wales continuing into the body of the garment, and of floats or runs of yarn, said welt having a selvage structure to prevent the raveling of its initial courses, and having loops of a course subsequent to and near the initial course penetrated by loops of the body fabric, whereby the welt is integrally attached to the body both at the beginning and end thereof.

6. The art of knitting a fabric having an integral welt comprising in succession first drawing loops of an initial course in some only of the wales at the beginning of the web, then drawing loops for a second course in all the wales of the web whereby the initial course is included between alternations of loops of said second course; then initiating and continuing solid plain knitting upon certain wales of the web, including some of those wales in which loops were not drawn in the initial course, and excluding other of said wales, to form a fabric for the welt, comprising sections of solid fabric connected by floats of free yarn at the wales excluded from the operation; and then knitting in all of the wales of the fabric, the operation including drawing an initial stitch of the succeeding section of fabric through the final stitch of the wale which was excluded from the previous operation.

7. The art of producing an integral welt upon a plain knit fabric which comprises supplying a course of yarn to and knitting at some only of a series of instruments employed in knitting; then supplying a course of yarn to and knitting at all of said instruments; then knitting at groups of said instruments less than the whole in number and greater in number than those supplied with the first course, the operation including the retention of the last knit loop upon those instruments at which there is no knitting; and then knitting a succeeding section of fabric at all of the instruments having therein initial loops engaging said retained loops.

8. The art of knitting a fabric having an integral welt which consists in first knitting a selvage strip or yarn structure having an initial course of yarn engaging alternate wales only and a succeeding course engaging every wale of the fabric, and then proceeding to knit fabric having groups of adjacent knit-wales including two or more of those engaged by said initial course, and excluding certain other wales; retaining the last stitch knit in said excluded wales; and thereafter knitting an initial and succeeding courses for a body portion in all of the wales, said initial course including a loop passing through the last stitch of each of the excluded wales.

9. As an article of manufacture, a stocking having a foot and leg portions of plain knit fabric, and having an integral outturned hem fastened on the face of the upper end of the leg by uniting stitches of the welt fabric separated by a plurality of wales of loops, the initial courses of said separating wales having a yarn structure secure against raveling and capable of lateral extension.

In testimony whereof, I have signed my name to this specification in the presence of two subscribing witnesses.

ROBERT W. SCOTT.

Witnesses:
M. G. Crozier,
Mary F. Griffin.

Correction in Reissue Letters Patent No. 13,751.

It is hereby certified that in Reissue Letters Patent No. 13,751, reissued June 16, 1914, upon the application of Robert W. Scott, of Boston, Massachusetts, for an improvement in "Welted Garment and Method of Making the Same," an error appears in the printed specification requiring correction as follows: Page 3, line 30, for the word "in" read *and;* and that the said Letters Patent should be read with this correction therein that the same may conform to the record of the case in the Patent Office.

Signed and sealed this 7th day of July, A. D., 1914.

[SEAL.]

R. F. WHITEHEAD,

*Acting Commissioner of Patents.*